US010399489B2

(12) United States Patent
Thompson (10) Patent No.: US 10,399,489 B2
(45) Date of Patent: Sep. 3, 2019

(54) STEERING WHEEL HORN ASSEMBLY (71) Applicant: Otnid Bellot Thompson, Fort Lauderdale, FL (US)

(72) Inventor: Otnid Bellot Thompson, Fort Lauderdale, FL (US)

(*) Notice: Subject to any disclaimer, the term of this patent is extended or adjusted under 35 U.S.C. 154(b) by 0 days.

(21) Appl. No.: 15/675,444

(22) Filed: Aug. 11, 2017

(65) Prior Publication Data

US 2019/0047470 A1 Feb. 14, 2019

(51) Int. Cl.
*G06F 7/00* (2006.01)
*B60Q 5/00* (2006.01)
*B62D 1/04* (2006.01)
*H01H 13/81* (2006.01)
*B60Q 3/283* (2017.01)

(52) U.S. Cl.
CPC ............ *B60Q 5/003* (2013.01); *B60Q 3/283* (2017.02); *B62D 1/046* (2013.01); *H01H 13/81* (2013.01); *H01H 2231/026* (2013.01)

(58) Field of Classification Search
CPC ........ B60Q 5/003; H01H 3/142; G08B 21/06; B62D 1/046
USPC .................. 340/426.31, 425.5, 575; 701/36
See application file for complete search history.

(56) References Cited

U.S. PATENT DOCUMENTS

| 1,471,778 A | 10/1923 | Cope |
| 1,748,015 A | 2/1930 | Douglas |
| 2,579,292 A | 12/1951 | Brelsford |
| 4,638,131 A | 1/1987 | Kidd et al. |
| 4,742,192 A * | 5/1988 | Levine ............... H01H 3/142 200/61.57 |
| 6,928,351 B2 | 8/2005 | Bowmann |
| 8,003,902 B1 * | 8/2011 | Cannella ............. B60Q 1/46 200/1 B |
| 2003/0141978 A1 * | 7/2003 | D'Agosto ............ G08B 21/06 340/575 |
| 2010/0276264 A1 | 11/2010 | Boeckstiegel et al. |
| 2012/0179328 A1 * | 7/2012 | Goldman-Shenhar ...... B62D 1/046 701/36 |
| 2013/0169040 A1 | 7/2013 | Hallet |
| 2016/0311366 A1 * | 10/2016 | Lisseman ............ G02B 6/0085 |
| 2016/0336009 A1 * | 11/2016 | Takei ................ G10L 15/22 |

(Continued)

*Primary Examiner* — Munear T Akki
(74) *Attorney, Agent, or Firm* — Mark C. Johnson; Johnson | Dalal (57) ABSTRACT A steering wheel horn assembly operates the horn of a vehicle through driver initiated application of pressure on a steering wheel body. The assembly permits a driver to activate a vehicle horn without the driver having to remove one or more hands from the steering wheel. A circular steering wheel body is bifurcated into first and second steering wheel body sections having cooperating first and second electrical contact members. The steering wheel body sections are pressed together through application of pressure from the driver's hands to an active position. In the active position, the electrical contact members engage to complete a circuit; thereby actuating an audible sound from the horn. Springs bias the steering wheel body sections apart to disengage the electrical contact members to an inactive position. Applying pressure to create the active position also actuates illumination from vehicle lights, simultaneously with the audible sound from the horn.

17 Claims, 6 Drawing Sheets

(56) References Cited

U.S. PATENT DOCUMENTS

2016/0355179 A1* 12/2016 Cannella .................. B60T 7/22
2017/0057409 A1* 3/2017 Borghi .................. B60Q 5/003

* cited by examiner

STEERING WHEEL HORN ASSEMBLY

FIELD OF THE INVENTION

The present invention relates generally horns, and, more particularly, relates to a horn that is operationally integrated into a vehicle steering wheel.

BACKGROUND OF THE INVENTION

Typically, vehicles, such as cars, trucks, vans, SUV's, tractor trailers, and buses, include a horn that can be engaged by the operator of the vehicle to produce audible warnings to the operators of other vehicles and to pedestrians. Horns work particularly well in rather quiet environments, such as country roadways, where the variety and intensity of sound is limited and relatively subdued. Busy city roads are another matter.

A typical conventional steering wheel for a vehicle is configured so that spokes extend radially from a boss which is secured to a steering shaft, and a steering wheel rim is secured to the respective distal ends of the spokes so that the driver grips the rim when steering the vehicle. The operator grasps the circumferential region of the steering wheel and spins the wheel to turn the vehicle.

Often, the operator of the vehicle is preoccupied with steering, watching for pedestrians, oncoming traffic, and other road conditions. This can leave the operator with insufficient time to remove the hands from the steering wheel and activate the horn, thereby posing an inherent safety risk to the driver, passengers of the vehicle, and other individuals. Also, due to the high level of noise outside the vehicle, horn signals are often hard to hear particularly by those with diminished hearing.

Therefore, a need exists to overcome the problems with the prior art as discussed above.

SUMMARY OF THE INVENTION

The invention provides a steering wheel horn assembly that overcomes the hereinafore-mentioned disadvantages of the heretofore-known devices and methods of this general type and that operates an electrical horn of a vehicle through driver initiated application of pressure on a steering wheel body. The steering wheel horn assembly is configured to effectively permit a driver to activate a vehicle horn without the driver having to remove one or more hands from the steering wheel. A vehicle light may also be actuated in the same manner, simultaneously, or progressively, with the electrical horn.

The assembly provides a power source, a ground, and an electrical horn that are in electrical communication with each other. A circular steering wheel body is bifurcated into first and second steering wheel body sections having cooperating first and second electrical contact members. The steering wheel body sections are pressed together through application of pressure from the driver's hands to an active position. In the active position, the electrical contact members engage to complete a circuit; thereby actuating an audible sound from the horn.

The first steering wheel body section includes a plurality of springs. The springs bias the steering wheel body sections apart to disengage the electrical contact members to an inactive position. Applying pressure to create the active position may also actuates illumination from vehicle lights. The illumination is simultaneous with the audible sound from the electrical horn. The audible sound and the illumination may be variable increased and decreased through variations in applied pressure to the steering wheel body.

With the foregoing and other objects in view, there is provided, in accordance with the invention, a steering wheel horn assembly that is operable in an active mode that generates an audible sound from a horn, based on application of pressure thereon.

In accordance with another feature, an embodiment of the present invention includes first and second electrical contact members that are each respectively flanked by the first and second steering wheel body sections.

In accordance with a further feature of the present invention, a plurality of springs are coupled to the first steering wheel body sections, the springs biasing the circular wheel body to the inactive position.

In accordance with a further feature of the present invention, the plurality of springs bias the first steering wheel body sections of the circular wheel body to the inactive position.

In accordance with the present invention, a method for the first electrical contact members are circular and continuous.

In accordance with a further feature of the present invention, the first electrical contact members are disposed in a spaced-apart relationship spanning the circumference of the first steering wheel body section.

In accordance with a further feature of the present invention, the second electrical contact members are circular and continuous.

In accordance with a further feature of the present invention, the second electrical contact members are disposed in a spaced-apart relationship spanning the circumference of the second steering wheel body section.

In accordance with a further feature of the present invention, the active mode generates an illumination.

In accordance with a further feature of the present invention, an application of pressure on the steering wheel body causes the horn assembly to be placed in the active mode.

In accordance with a further feature of the present invention, increasing the pressure on the steering wheel body causes the audible sound to increase proportionally to the pressure.

In accordance with the present invention, a method for operation of a steering wheel horn assembly actuates an audible sound from a horn of a motorized vehicle through driver-initiated application of pressure on a circular steering wheel body. The method includes an initial step, or "Step(s)," of coupling a power source and an electrical ground to an electrical horn of a vehicle.

The method also includes a Step of providing a steering wheel body that is rotatably couplable to the vehicle. The steering wheel body comprises a first steering wheel body section with a first electrical contact member; and a second steering wheel body section superimposed and unitarily translatably coupled with the first circular wheel body section, and having a second electrical contact member.

Another Step comprises applying pressure to the steering wheel body, such that the first and second electrical contact members engage; whereby an electrical circuit is closed with the power source, the ground, and the electrical horn. A final Step includes actuating the horn to emit an audible sound, the audible sound having a volume that is in relation to the pressure applied to the steering wheel body.

Although the invention is illustrated and described herein as embodied in a steering wheel horn assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances, these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
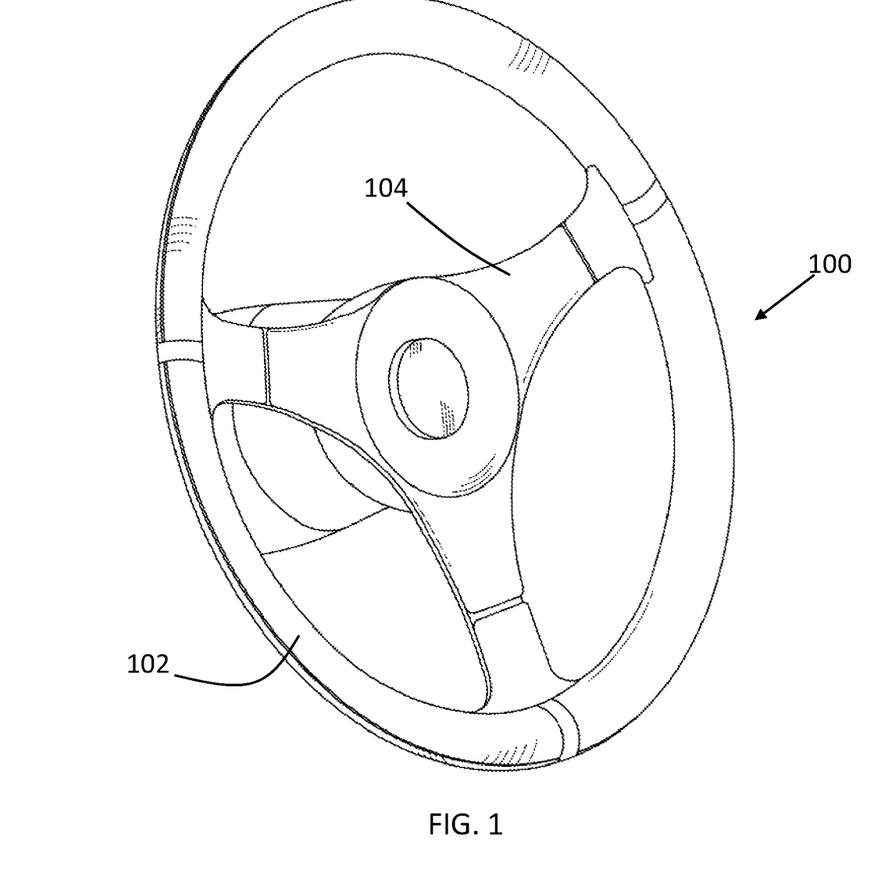
FIG. 1 is a perspective view of an exemplary steering wheel horn assembly, in accordance with the present invention.
Figure 4:
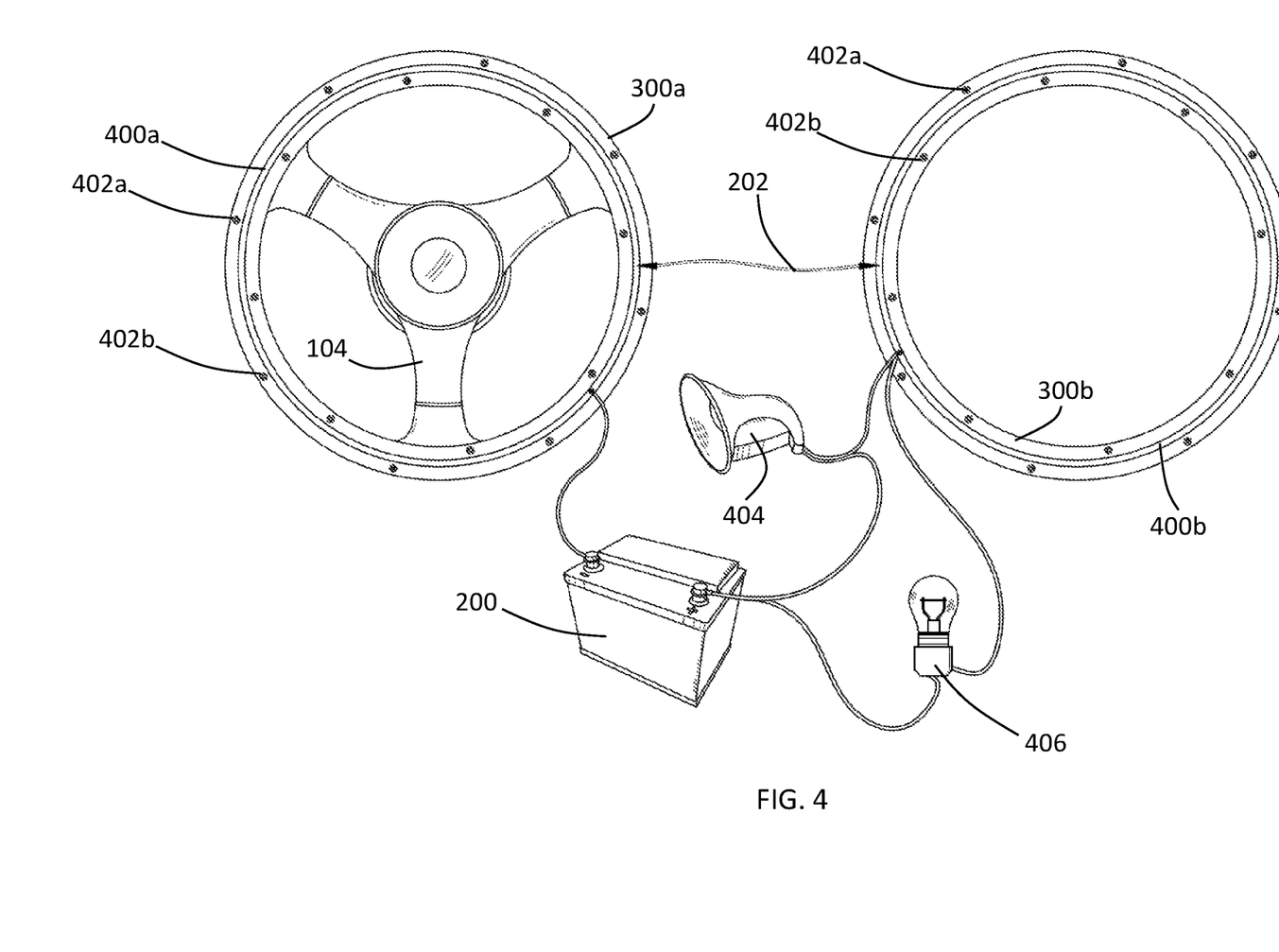
FIG. 4 is a sectioned and schematic view of a front and rear portion of the steering wheel horn assembly shown in FIG. 1, in accordance with the present invention.

With reference to FIGS. 1 and 4, the present invention provides a novel and efficient steering wheel horn assembly 100 that is operatively connected to a steering system 104 of a vehicle, e.g., a car, bus, train, etc., for operating an electrical horn 404 and/or a vehicle light 406, or both in direct response to driver-initiated pressure applied to a steering wheel body 102. While the figures show several advantageous features of the present invention, as will be described below, the invention can be provided in several shapes, sizes, combinations of features and components, and varying numbers and functions of the components.

The steering wheel horn assembly 100, hereafter "assembly 100," is operably configured to enable operation of an electrical horn 404 commonly used in motorized vehicles through driver-initiated application of pressure on the steering wheel body 102. The assembly 100 effectively permits a driver to safely activate the horn 404 without the driver having to remove one or more hands from the steering wheel body 102. In this manner, the hands of the driver remain on the steering wheel 104 to simultaneously steer the vehicle, and actuate the horn. This frees the driver to concentrate more acutely on the task of driving.

Furthermore, the assembly 100 can also actuate the vehicle lights 406 to generate an illumination through application of pressure on the steering wheel body 102. The illumination from the light 406 may be actuated simultaneously with the audible sound from the horn 404. This allows for both a visual and audible sound for getting the attention of pedestrians and oncoming traffic in the path of the vehicle.

In other embodiments, the audible sound generated by the electrical horn 404 and the illumination from the light 406 may be variable increased and decreased through variations in the pressure that the driver applies to the steering wheel body 102. Additionally, the intensity of the light and/or audible sound may be increased by the duration of electrical contact (as discussed herein) using, for example, a time counter communicatively coupled to a process on a PCB board. Thus, by allowing the driver to operate the electrical horn 404 and the light 406 directly from the steering wheel body 102, the driver does not have to remove one or more hands from the steering wheel body 102 to activate the electrical horn 404 or the light 406.

Figure 2:
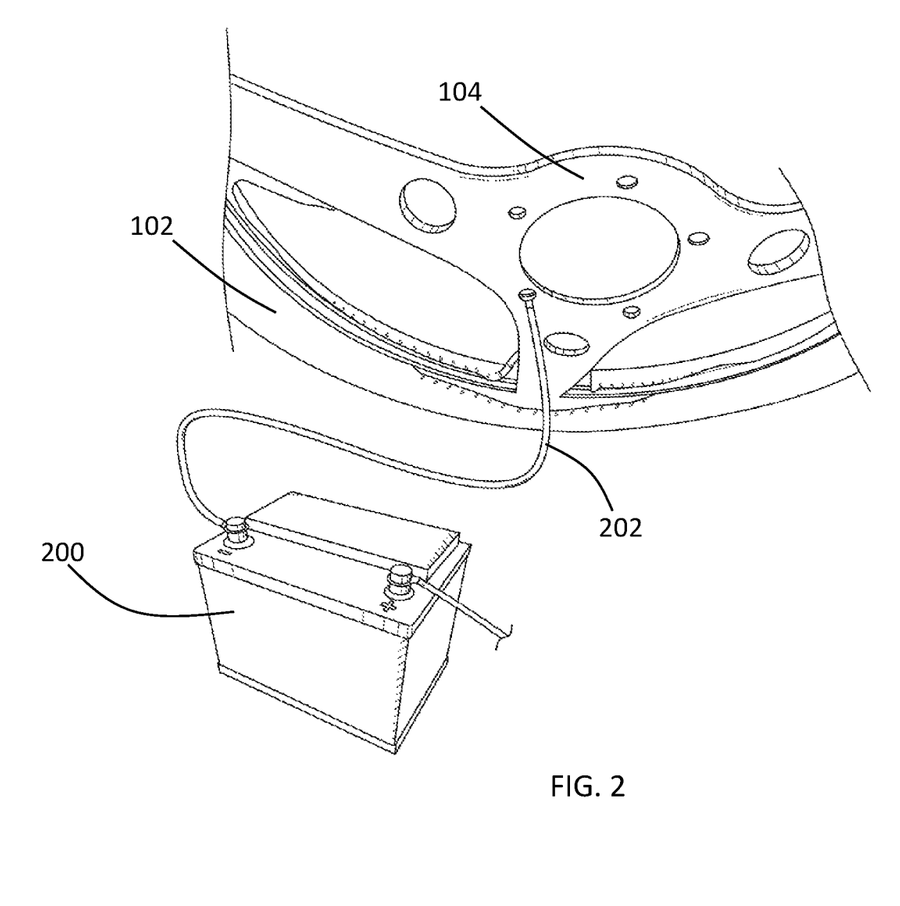
FIG. 2 is a perspective view of an exemplary power source and ground for completing a circuit of the steering wheel horn assembly, in accordance with the present invention.
Figure 3:
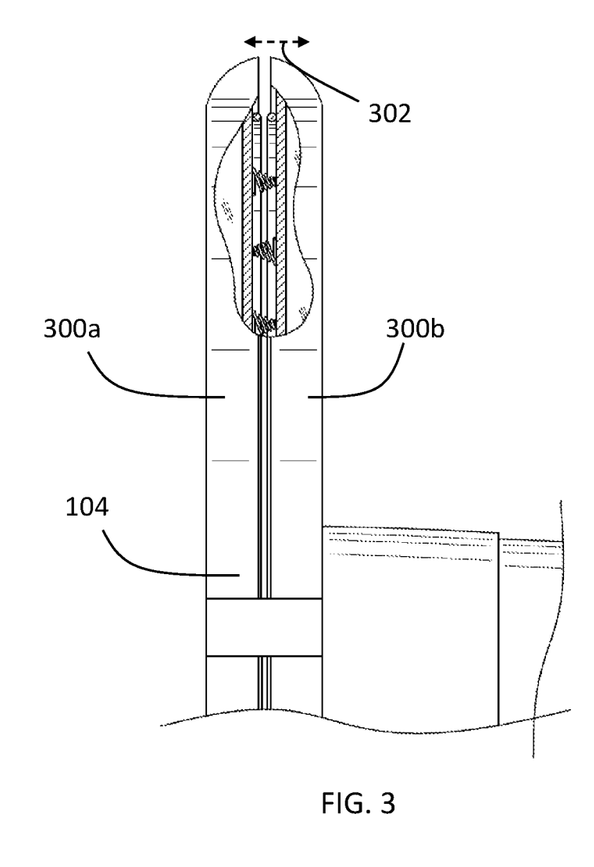
FIG. 3 is a close-up elevational side view of the circular steering wheel body bifurcated into first and second steering wheel body sections, in accordance with the present invention.

With reference now to FIGS. 2-4, embodiments of the invention provide a circular steering wheel body 102 that is bifurcated or separated into a first steering wheel body section 300a and a second steering wheel body section 300b. The first and second steering wheel body sections 300a-b are configured to substantially encapsulate a portion of the vehicle steering wheel 104. The steering wheel body sections 300a-b include cooperating first and second electrical contact members 400a, 400b that transmit electrical current when engaged, but are biased in tension through a plurality of springs 402a, 402b to remain disengaged. In one embodiment, there are four springs disposed circumferentially around the wheel 104 in equal distances, wherein each spring has a spring constant "k" of approximately 15-30 lbf/in, thereby providing sufficient resistance force that would otherwise inadvertently trigger the horn by the weight or pressure of the user's hands. In other embodiments, the spring constant, amount of springs, and location of the springs may vary.

In addition, embodiments of the invention allow the first and second steering wheel body sections 300a-b to be pressed together through application of pressure from the driver's hands to the steering wheel body 102. Through application of this pressure by the driver, the electrical contact members 400a-b are forced together to complete an electrical circuit, thereby actuating an audible sound from the electrical horn 404, or increased illumination of a vehicle's head light 406, or both.

With the foregoing and other objects in view, there is provided, in accordance with the invention, a steering wheel horn assembly 100 that is operable in an active mode to generate an audible sound from a horn, based on application of pressure thereon.

The assembly 100 includes a steering wheel body 102 rotatably couplable to a vehicle steering wheel 104, and specifically encapsulates all or a portion of the circumference of the vehicle steering wheel 104. In some embodiments, the vehicle may include, without limitation, an automobile, a motorcycle, a boat, and an aircraft. In one embodiment, the steering wheel body 102 is operationally attached to a steering wheel that directs the vehicle in a desired direction.

In another embodiment, the steering wheel body 102 is integral to a steering system that is manipulated by the driver, responding directly to driver inputs, such as rotating the steering wheel body 102. This manipulation can be through direct mechanical contact with the steering system as in recirculating ball or rack-and-pinion steering gears, or with the assistance of computer-controlled motors, e.g., electric power steering.

In one embodiment, steering wheel body 102 is defined by a generally circular shape, and is mounted to a steering column by a hub connected to the outer ring of the steering wheel by one or more spokes. However, in other embodiments, the steering wheel body 102 may have an oval shape, a butterfly shape, a square shape, or other shape known in the art of steering mechanisms. In yet another embodiment, the steering wheel body 102 comprises at least one control stick, such as found on airboats. In one embodiment, the steering wheel body 102 also typically mounts on the left side of the vehicle. However, in countries where vehicles drive on the left side of the road, the steering wheel body 102 mounts may be mounted on the right side of the vehicle.

In operation, the steering wheel 104 is used with strategic movements of the hand and wrist in spinning/rotating motions. The driver grips the circumference of the steering wheel body 102 and rotates/spins the steering wheel 104 to the left for steering left, and to the right for steering right. The arc of rotation by the steering wheel 104 is determinative of the amount of steerage by the wheels.

Turning now to FIG. 2, the assembly 100 further comprises a power source 200 and an electrical ground 202 that are operably configured to provide power and form an electrical reference point for the assembly 100. The power source 200 may include an independent battery that is used to power the assembly 100. However, the power source 200 may also include a vehicle battery, such as an integrated automotive battery or a rechargeable battery that supplies electrical energy to the vehicle. In some embodiments, the power source 200 may include, without limitation, a 12 V, 40 Ah lead-acid car battery.

The electrical ground 202 may include a reference point in an electrical circuit from which voltages from the power source 200 are measured, a common return path for electric current, or a direct physical connection to a surface of the vehicle or Earth. In one embodiment, a wire attaches to the spokes of the steering wheel for the ground 202 (FIG. 2).

As illustrated in FIG. 3, the steering wheel body 102 comprises a first steering wheel body section 300a and a second steering wheel body section 300b. The second steering wheel body section 300b is superimposed and unitarily translatably coupled with the first circular wheel body section 300a. Said another way, the body section 300b is operably configured to move as a single piece with respect to the other section 300a. This is not to say, however, that the entire body section 300b is required to translate as one piece to form an electrical circuit providing power to the horn, as only a portion of the body section 300b may be required to do so. In one embodiment, the steering wheel body 102 is bifurcated into two equal sizes and dimensions of the first and second steering wheel body sections 300a-b. The first and second steering wheel body sections 300a-b may thus, clamp around the steering wheel 104, or be integrated therein, forming the steering wheel itself.

As referenced in FIG. 4, a plurality of springs 402a-n, wherein "n" represents any number greater than 1, are disposed between the steering wheel body sections 300a-b. The springs 402a-b are coupled to at least one of the steering wheel body sections 300a-b. The springs are configured 402a-b to bias the steering wheel body sections 300a-b apart from each other by exerting a spring tension against opposing steering wheel body sections 300a-b.

In one embodiment, the spring tension may be adjusted to vary the pressure required to press the first and second steering wheel body sections 300a-b together. Also, the number of springs 402a, 402b may be increased or decreased to vary the pressure required to press together the first and second steering wheel body sections 300a-b. In one embodiment, either the first or second steering wheel body sections 300a-b is displaced in relation to each other. In another embodiment, both steering wheel body sections 300a-b are displaced simultaneously in relation to each other.

As illustrated in FIGS. 3-4, the first steering wheel body section 300a comprises a first electrical contact member 400a. The first electrical contact member 400a may include metal or other known conductive elements that completes an electrical circuit (when electrically coupled to a contact member 400b) between power source 200, ground 202, and electrical horn 404, and/or light 406. As such, similar to the first steering wheel body section 300a, the second steering wheel body section 300b includes the second electrical contact member 400b. The first and second electrical contact members 400a-b are each respectively flanked by the first and second steering wheel body sections 300a-b, positioned along a wheel section translation path (exemplarily represented with arrow 302). The translation path 302 may be linear and/or curvilinear and may span a length separating the electrical contact members 400a-b. As discussed below, the electrical contact members 400a-b may form a continuous bar, or a series of tightly spaced-apart contact members, i.e., members spaced approximately four inches or less away from another.

The first and second steering wheel body sections 300a-b form a cooperating arrangement that allows each section 300a-b to be displaced closer and further in relation to each other based on a pressure applied thereto. Thus, as the first and second steering wheel body sections 300a-b are displaced, their respective electrical contact members 400a-b engage and disengage to close and open a circuit. Further, the contact members 400a-b may also travel with the respective body section 300a-b in which it is coupled.

At least one of the first and second electrical contact members 400a-b are electronically coupled to the power source 200, the electrical ground 202, and to the horn. As those of skill in the art will appreciate, this electrical interconnection forms an electrical circuit that is closed and opened, depending on the position of the steering wheel body sections 300a-b relative to each other.

As shown in FIG. 4, the first and second electrical contact members 400a-b may be disposed in a circular and continuous arrangement in alignment with their respective steering wheel body sections 300a-b. Said another way, the contact members 400a-b are substantially free from discontinuities, in that there is at least one portion of the respective members that is continuous. This may include an electrically conductive continuous bar, preferably having a substantially planar outermost surface to provide greater surface contact, that follows the shape of the wheel.

Figure 5:
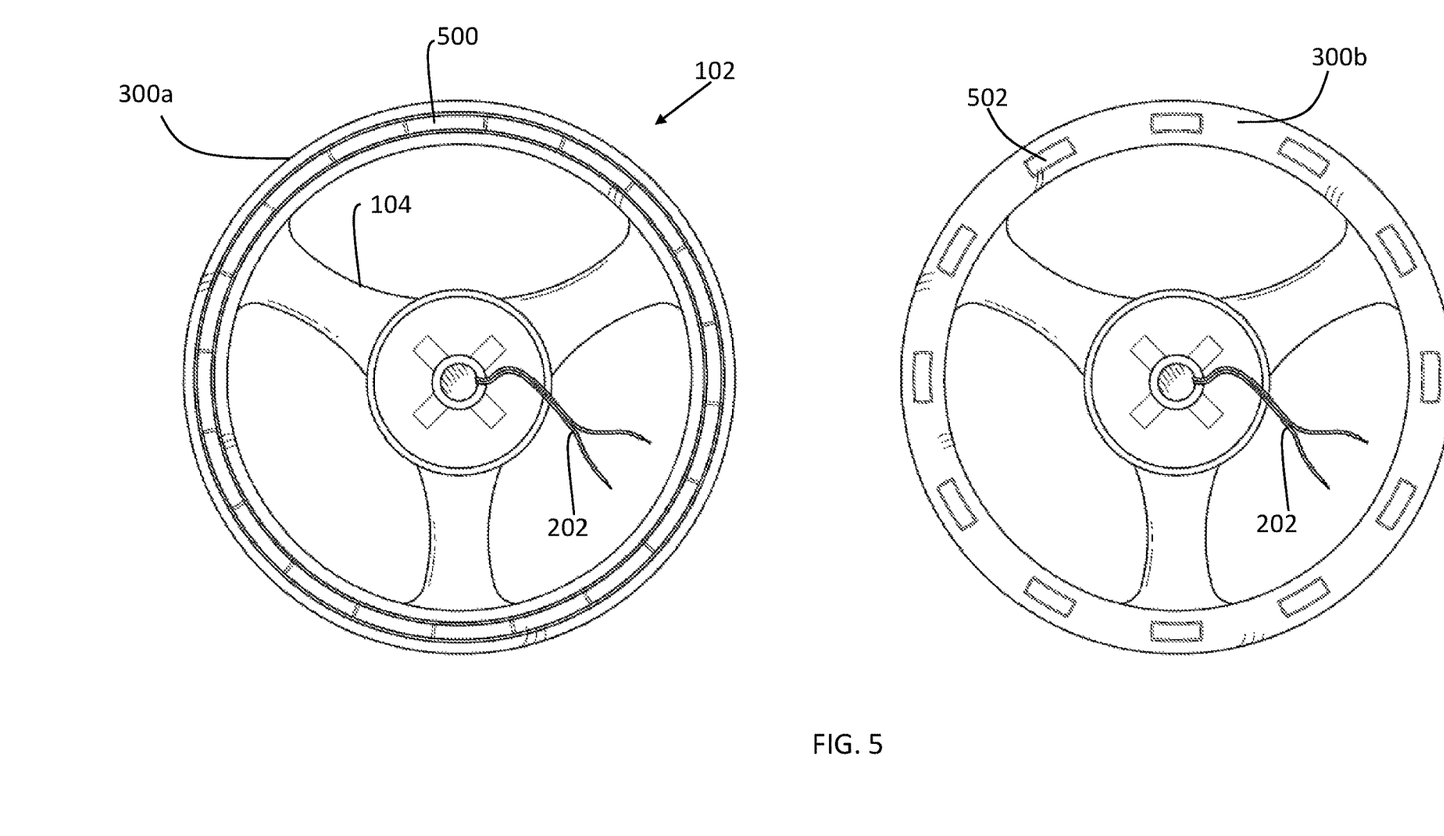
FIG. 5 is a sectioned view of a front and rear section of a steering wheel horn assembly, in accordance with another embodiment of the present invention.

An alternative embodiment of the electrical contact members is illustrated in FIG. 5. Here, one or both of the first and second electrical contact members are a series of independent conductive members 502 that are disposed in a tight, substantially equal spaced-apart relationship spanning the circumference of the first steering wheel body section 300a-b. Thus, the electrical contact members 502 may be intermittently disposed in a tightly spaced arrangement of separate metal contacts that span the circumference of the steering wheel body 102. The electrical contact members 502 may also be independently coupled to a button with one or more LEDs that are operably configured to light up. To that end, the one or more LEDs may be electrically coupled to the power source, e.g., battery 200.

Whether as a continuous bar, or independently disposed in a spaced-apart relationship, the first and second electrical contact members 400a-b engage each other to close the circuit as the driver squeezes the first and second steering wheel body sections 300a-b together. Alternatively, with respect to the second embodiment shown in FIG. 5, each of the contact members 502 may be independently translatable (in a direction akin to the translation path 302 shown in FIG. 3) a length sufficient to make electrically connection or couple with the opposing electrical member 500. The coupling closes the electrical circuit, and thereby places the steering wheel body 102 in the active position. The active position is formed along a wheel section translation path 302 as a result of the pressure applied to the first and second steering wheel body section 300a-b.

As the first and second electrical contact members 400a-b are operatively coupled to the power source 200, the ground 202, and the electrical horn 404, the closed circuit actuates an audible sound from the electrical horn 404. The active position actuates the audible sound from the electrical horn 404, the illumination from the light 406, or both.

Conversely, as the driver releases the steering wheel body 102, the springs 402a-b bias the first and second electrical contact members 400a-b to physically uncouple from one another. As discussed above, the springs 402a-b work to bias the circular wheel body to the inactive position, as spring tension displaces the first and second steering wheel body sections 300a-b apart from each other. This forms the inactive position, in which the electrical circuit is opened. In the inactive position the audible sound from the electrical horn 404, the illumination from the light 406, or both, are deactivated.

It is significant to note that the amount of pressure that must be applied by the driver to the first and second steering wheel body sections 300a-b to actuate the active position may be adjusted. This adjustment can include varying the spring tension or constant, k, of the springs 402a-b, or adding or removing springs 402a-b from the first steering wheel body section 300a-b. This can be useful to adapt to drivers with different hand strengths.

In an alternative embodiment, the active mode of the assembly 100 generates an illumination form the vehicle lights 406. The application of pressure on the first and second steering wheel body sections 300a-b closes the circuit to actuate an illumination from the vehicle light 406. Thus, the illumination is simultaneously operable with the audible sound from the electrical horn 404. This feature of the assembly 100 provides a combined visual and audible sound for getting the attention of pedestrians and oncoming traffic in the path of the vehicle. Such externally visible vehicle lights may include, without limitation, headlights, taillights, running lights, parking lights, or other externally-mounted lights.

In other embodiments, the audible sound and the illumination may be variable increased and decreased by varying the amount of pressure or time that is applied to the steering wheel body 102. Thus, as the driver increases the pressure on the steering wheel body 102 or holds a particular amount of pressure to the steering wheel body for a particular period of time, the volume of the audible sound, or the intensity of the illumination increases proportionally to the applied pressure. In one embodiment, pressing the steering wheel body 102 into the active mode, creates externally visible vehicle lights 406 that can be contemporaneously dimmed or brightened.

Figure 6:
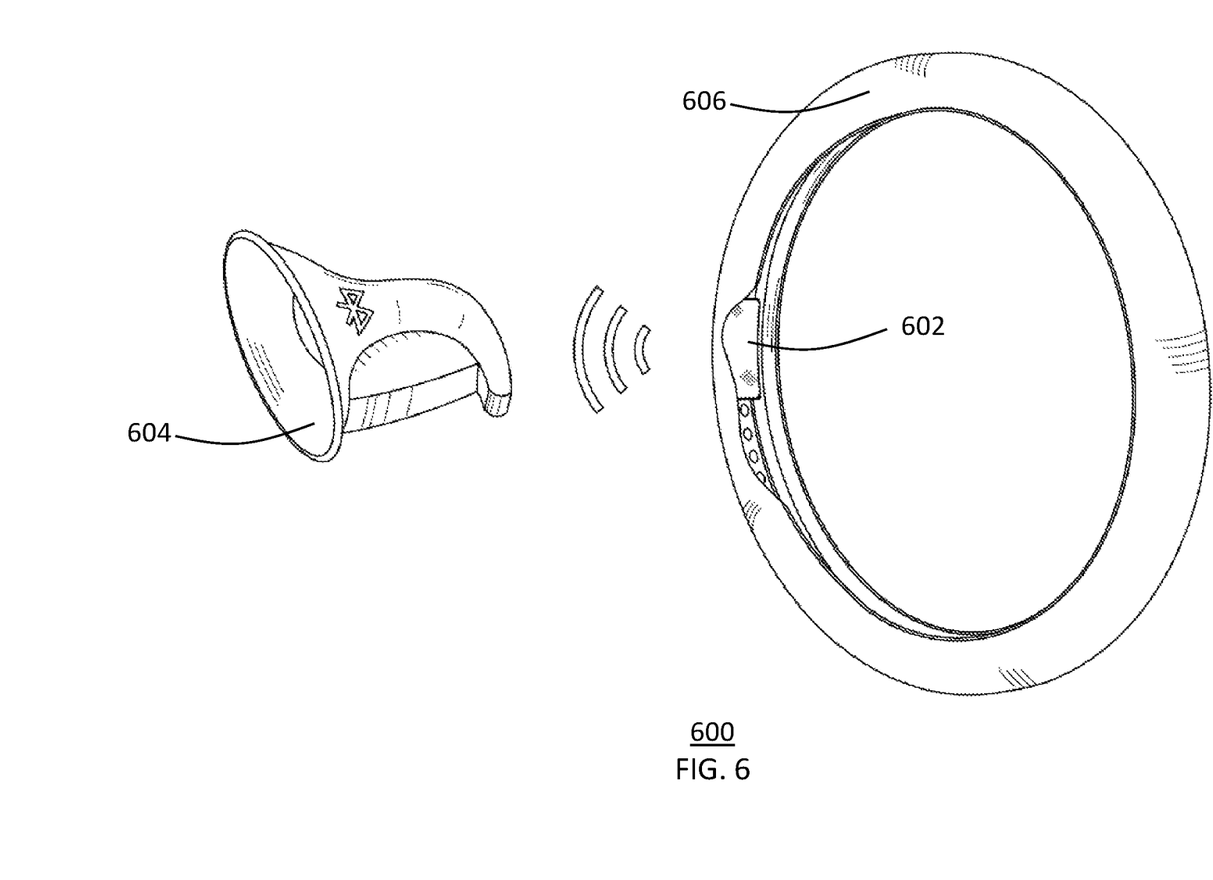
FIG. 6 is a perspective view of an alternative embodiment of a steering wheel horn assembly, showing Bluetooth data transmission to actuate an electrical horn, in accordance with the present invention.

Yet another alternative embodiment of a steering wheel horn assembly 600 is referenced in FIG. 6. In this embodiment, the assembly 600 utilizes Bluetooth™ technology to transmit a signal for actuating an audible sound from a Bluetooth adapted horn 604. A data transmitter 602 operatively couples to the steering wheel body 606. As the steering wheel body 606 is pressed to achieve the active position, the transmitter 602 exchanges data with the Bluetooth adapted horn 604 using short-wavelength UHF radio waves in the ISM band from 2.4 to 2.485 GHz, or other wavelengths known in the art.

It is significant to note that with this Bluetooth embodiment, the circuitry is not used, but rather data signals are wirelessly transmitted to actuate the audible sound, or the illumination, or both. In operation, any place on the steering wheel body 606 may be pressed by the driver to actuate the transmitter 602, and thereby transmit the data for actuating the Bluetooth adapted horn 604. In yet another alternative embodiment, the Bluetooth™ technology of the assembly 600 is applicable with a relay microchip that actuates the light 406 to flash bright lights. This visual indicator can be useful for pedestrians and oncoming vehicles that cannot hear the Bluetooth horn 604.

In accordance with the present invention, a method for operation of a steering wheel horn assembly actuates an audible sound from a horn of a motorized vehicle through driver-initiated application of pressure on a circular steering wheel body. The method includes an initial Step of coupling a power source and an electrical ground to an electrical horn of a vehicle.

The method also includes a Step of providing a steering wheel body that is rotatably couplable to the vehicle. The steering wheel body comprises a first steering wheel body section with a first electrical contact member, and a second steering wheel body section superimposed and unitarily translatably coupled with the first circular wheel body section, and having a second electrical contact member.

Another Step comprises applying pressure to the steering wheel body, such that the first and second electrical contact members engage; whereby an electrical circuit is closed with the power source, the ground, and the electrical horn. A final Step includes actuating the horn to emit an audible sound, the audible sound having a volume that is in relation to the pressure applied to the steering wheel body.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A steering wheel horn assembly comprising:
   a power source;
   an electrical ground;
   an electrical horn having an active mode generating an audible sound; and
   a steering wheel body defining an outer circumference and an inner circumference, and having:
     a first steering wheel body section with a first electrical contact member;
     a second steering wheel body section superimposed and unitarily translatably, as a single piece, coupled, with a plurality of springs, with the first wheel body section, the second steering wheel body section including a second electrical contact member disposed in between the first and second steering wheel body sections, at least one of the first and second electrical contact members:
     electronically coupled to the power source;
     electronically coupled to the electrical ground; and
     electronically coupled to the horn assembly;
     an inactive position along a wheel section translation path with the first and second electrical contact members physically uncoupled to one another and with the first and second steering wheel body sections disposed and biased, with the plurality of springs, in a bifurcated relationship defining a separational space spanning inwardly from both outer circumference and the inner circumference toward the first and second electrical contact members spanning around the perimeter of the steering wheel body; and
     an active position along the wheel section translation path with the first and second electrical contact members physically and electrically coupled to one another causing the horn assembly in to be placed in the active mode.

2. The steering wheel horn assembly according to claim 1, wherein:
   the steering wheel body is defined by a generally circular shape.

3. The steering wheel horn assembly according to claim 1, wherein:
   the first and second electrical contact members are each respectively flanked by the first and second steering wheel body sections.

4. The steering wheel horn assembly according to claim 1, wherein:
   the first electrical contact member is circular and continuous spanning the circumference of the first steering wheel body section.

5. The steering wheel horn assembly according to claim 3, wherein:
   the second electrical contact member is disposed in a spaced-apart relationship spanning the circumference of the first steering wheel body section.

6. The steering wheel horn assembly according to claim 1, wherein:
   the first and second electrical contact members are circular and continuous.

7. The steering wheel horn assembly according to claim 1, further comprising:
   a light.

8. The steering wheel horn assembly according to claim 7, wherein:
   a light generates an illumination in the active mode.

9. The steering wheel horn assembly according to claim 1, wherein:
   an application of pressure on the steering wheel body causes the electrical horn to the active mode.

10. The steering wheel horn assembly according to claim 9, wherein:
    increasing the pressure on the steering wheel body causes the audible sound to increase proportionally to the applied pressure.

11. The steering wheel horn assembly according to claim 1, further comprising:
    a Bluetooth enabled steering wheel horn assembly comprising a data transmitter and a Bluetooth adapted horn.

12. A steering wheel horn assembly comprising:
    a power source;
    an electrical ground;
    an electrical horn having an active mode generating an audible sound; and
    a steering wheel body defined by a generally circular shape, an outer circumference, and an inner circumference, the steering wheel body rotatably couplable to a vehicle and having:
      a first steering wheel body section with a first electrical contact member, the first electrical contact member being disposed in a close, spaced-apart relationship spanning the circumference of the first steering wheel body section;
      a second steering wheel body section superimposed and unitarily translatably coupled, as a single piece, with the first steering wheel body section, the second steering wheel body section including a second electrical contact member, at least one of the first and second electrical contact members:

electronically coupled to the power source;
electronically coupled to the electrical ground; and
electronically coupled to the horn assembly;
a plurality of springs interposed between and coupled to the first steering wheel body section and the first steering wheel body section;
an inactive position along a wheel section translation path with the first and second electrical contact members physically uncoupled to one another and with the first and second steering wheel body sections disposed and biased, with the plurality of springs, in a bifurcated relationship defining a separational space spanning inwardly from both outer circumference and the inner circumference toward the first and second electrical contact members as spanning around the perimeter of the steering wheel body; and
an active position along the wheel section translation path with the first and second electrical contact members physically and electrically coupled to one another causing the horn assembly in to be placed in the active mode.

13. The steering wheel horn assembly according to claim 12, wherein:
the first and second electrical contact members are each respectively flanked by the first and second steering wheel body sections.

14. The steering wheel horn assembly according to claim 12, further comprising:
A light for generating an illumination in the active mode.

15. The steering wheel horn assembly according to claim 14, wherein:
the active mode generates the illumination and the audible sound.

16. The steering wheel horn assembly according to claim 12, wherein:
an application of pressure on the steering wheel body causes the electrical horn to be placed in the active mode.

17. A steering wheel horn assembly consisting of:
a power source;
an electrical ground;
an electrical horn having an active mode for generating an audible sound;
a light having the active mode for generating an illumination; and
a circular steering wheel body rotatably couplable to a vehicle and defining an outer circumference and an inner circumference, and having:
a first steering wheel body section with a first electrical contact member, the first electrical contact member being disposed in a close, spaced-apart relationship spanning the circumference of the first steering wheel body section;
a second steering wheel body section superimposed and unitarily translatably, as a single piece, coupled, with a plurality of springs, with the first steering wheel body section, the second steering wheel body section including a second electrical contact member, at least one of the first and second electrical contact members:
electronically coupled to the power source;
electronically coupled to the electrical ground; and
electronically coupled to the electrical horn;
an inactive position along a wheel section translation path with the first and second electrical contact members physically uncoupled to one another and disposed in between the first and second steering wheel body sections and with the first and second steering wheel body sections disposed and biased, with the plurality of springs, in a bifurcated relationship defining a separational space spanning inwardly from both outer circumference and the inner circumference toward the first and second electrical contact members spanning around the perimeter of the steering wheel body;
an active position along the wheel section translation path with the first and second electrical contact members physically and electrically coupled to one another causing the electrical horn to be placed in the active mode; and
a plurality of springs coupled to the first steering wheel body sections and biasing the circular wheel body in the inactive position.

* * * * *